(12) United States Patent
Shin et al.

(10) Patent No.: US 10,612,647 B2
(45) Date of Patent: Apr. 7, 2020

(54) OIL PRESSURE SUPPLY SYSTEM OF AUTOMATIC TRANSMISSION

(71) Applicants: Hyundai Motor Company, Seoul (KR); Kia Motors Corporation, Seoul (KR)

(72) Inventors: Yong Uk Shin, Suwon-si (KR); Minho Chae, Incheon (KR); Chon Ok Kim, Yongin-si (KR); Sun Sung Kwon, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 121 days.

(21) Appl. No.: 15/948,195

(22) Filed: Apr. 9, 2018

(65) Prior Publication Data

US 2019/0203827 A1    Jul. 4, 2019

(30) Foreign Application Priority Data

Dec. 28, 2017   (KR) ........................ 10-2017-0182967

(51) Int. Cl.
*F16H 61/02*       (2006.01)
*F16H 41/30*       (2006.01)
*F16H 61/00*       (2006.01)

(52) U.S. Cl.
CPC ......... *F16H 61/0025* (2013.01); *F16H 41/30* (2013.01); *F16H 61/0251* (2013.01); *F16H 61/0276* (2013.01); *F16H 2061/0037* (2013.01)

(58) Field of Classification Search
CPC .. F16H 41/30; F16H 61/0021; F16H 61/0025; F16H 61/0031; F16H 61/0206;
(Continued)

(56) References Cited

U.S. PATENT DOCUMENTS 9,175,764 B2 * 11/2015 Hwang ............... F16H 61/0021
9,206,792 B2 * 12/2015 Wi ...................... F16H 61/0031
(Continued)

FOREIGN PATENT DOCUMENTS

| KR | 10-1490915 B1 | 2/2015 |
| KR | 10-1566728 B1 | 11/2015 |
| KR | 10-1601105 B1 | 3/2016 |

*Primary Examiner* — David R Morris
(74) *Attorney, Agent, or Firm* — Morgan, Lewis & Bockius LLP

(57) ABSTRACT

An oil supply system of an automatic transmission for vehicle may include low-pressure oil pump discharging the oil to low-pressure passage; torque converter control valve controlling flow of the low-pressure passage while recirculating some of surplus flow rate and supplying the controlled flow rate to an operating-side chamber of torque converter and downstream valve; torque converter lock-up clutch switch valve supplying the flow rate of the torque converter control valve and circulation flow rate of the operating-side chamber of the torque converter to lubrication passage; torque converter pressure control valve supplying the flow rate to non-operating side chamber of the torque converter; high-pressure oil pump boosting some of the flow rate of the low-pressure passage and discharging the boosted flow rate to high-pressure passage; and line regulator valve supplying the surplus flow rate during control process to the low-pressure passage and supplying the controlled flow rate to high-pressure portion.

6 Claims, 4 Drawing Sheets

(58) Field of Classification Search
CPC ............. F16H 61/0251; F16H 61/0276; F16H 2061/0037
See application file for complete search history.

(56) References Cited

U.S. PATENT DOCUMENTS

| | | | | |
|---|---|---|---|---|
| 9,291,078 B2* | 3/2016 | Wi | ................ | F01M 1/16 |
| 9,297,371 B2* | 3/2016 | Jo | ................ | F04B 49/002 |
| 9,316,221 B2* | 4/2016 | Wi | ................ | F16H 61/0021 |
| 9,316,307 B2* | 4/2016 | Wi | ................ | F04C 14/02 |
| 9,464,711 B2* | 10/2016 | Lee | ................ | F16H 61/0025 |
| 9,476,502 B2* | 10/2016 | Jo | ................ | F16H 61/0206 |
| 9,494,231 B2* | 11/2016 | Son | ................ | F16H 61/0031 |
| 9,500,277 B2* | 11/2016 | Jo | ................ | F16H 61/0025 |
| 9,574,655 B2* | 2/2017 | Hwang | ................ | F16H 61/0031 |
| 10,274,073 B1* | 4/2019 | Shin | ................ | F16H 57/0413 |
| 10,274,078 B2* | 4/2019 | Ichimura | ................ | F16H 61/0206 |
| 2013/0133766 A1* | 5/2013 | Hwang | ................ | F16H 61/0021 137/565.13 |
| 2014/0060676 A1* | 3/2014 | Wi | ................ | F16H 61/0021 137/565.01 |
| 2014/0060677 A1* | 3/2014 | Wi | ................ | F16H 61/0031 137/565.01 |
| 2014/0060679 A1* | 3/2014 | Wi | ................ | F01M 1/16 137/565.3 |
| 2014/0064990 A1* | 3/2014 | Jo | ................ | F16H 61/0031 417/253 |
| 2014/0158236 A1* | 6/2014 | Jo | ................ | F16H 61/0021 137/565.13 |
| 2014/0290767 A1* | 10/2014 | Jo | ................ | F16H 61/0206 137/565.11 |
| 2015/0027570 A1* | 1/2015 | Wi | ................ | F04B 49/24 137/563 |
| 2015/0167833 A1* | 6/2015 | Jo | ................ | F16H 61/0025 137/565.14 |
| 2015/0167835 A1* | 6/2015 | Hwang | ................ | F16H 61/0031 137/565.14 |
| 2015/0167837 A1* | 6/2015 | Lee | ................ | F16H 61/0025 74/473.11 |
| 2015/0361977 A1* | 12/2015 | Cho | ................ | F04C 11/001 418/200 |
| 2015/0361978 A1* | 12/2015 | Cho | ................ | F04C 15/0076 418/83 |
| 2016/0003348 A1* | 1/2016 | Son | ................ | F16H 61/0031 137/563 |
| 2017/0009877 A1* | 1/2017 | Ichimura | ................ | F16H 61/0206 |
| 2019/0120371 A1* | 4/2019 | Shin | ................ | F16H 61/0031 |
| 2019/0128399 A1* | 5/2019 | Shin | ................ | F16H 57/0435 |

* cited by examiner

OIL PRESSURE SUPPLY SYSTEM OF AUTOMATIC TRANSMISSION

CROSS-REFERENCE TO RELATED APPLICATION

The present application claims priority to Korean Patent Application No. 10-2017-0182967 filed on Dec. 28, 2017, the entire contents of which is incorporated herein for all purposes by this reference.

BACKGROUND OF THE PRESENT INVENTION

Field of the Present Invention

The present invention relates to an oil pressure supply system of an automatic transmission for a vehicle, and more particularly, to an oil pressure supply system of an automatic transmission for a vehicle, which bypasses a surplus flow rate to be supplied to a cooling/lubrication circuit when a flow rate supplied to a torque converter is unnecessarily large to reduce a load of the entirety of a low-pressure part.

Description of Related Art

Recently, as global oil prices have been high and emission regulations have been strengthened, automakers have concentrating on developing technologies that can enhance fuel efficiency a part of an environmentally friendly way.

Improvement of the fuel efficiency in AN automatic transmission may be achieved through enhancement of power transmission efficiency and the power transmission efficiency enhancement may be implemented by minimizing unnecessary consumption power of an oil pump.

As described above, to improve fuel efficiency, the oil pump applied to the automatic transmission is separated into a low-pressure oil pump and a high-pressure oil pump, and oil pressure generated by the low-pressure oil pump is supplied to a low-pressure portion (torque converter, cooling, and lubrication) and the oil pressure generated by the high-pressure oil pump is supplied to a high-pressure portion (a frictional member selectively operated at the time of shifting).

The low-pressure portion has a configuration of generating overall oil pressure and only partial oil pressure required by the high-pressure portion is controlled to high pressure and supplied to the high-pressure portion.

Accordingly, consumption power for driving the oil pump is minimized, so that the fuel efficiency may be enhanced. Furthermore, a load applied to the oil pump is reduced, reducing noise and vibration and enhancing durability.

However, in the oil pressure supply system in the related art described above, the torque converter, the cooling and the lubrication are tied together at the low-pressure portion, so that passage resistance is large and when a large amount of lubrication is required, the total passage resistance needs to be overcome and the flow rate needs to be supplied.

Furthermore, when a large amount of flow rate is supplied to the lubrication due to an inappropriate flow rate distribution for the torque converter and the lubrication, an undesired flow rate is supplied to the torque converter, increasing a flow rate load throughout a circuit of the low-pressure portion.

As a result, a problem in that the fuel efficiency due to driving loss of the oil pump is lowered occurs.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an oil pressure system of an automatic transmission for a vehicle, which bypasses a surplus flow rate and supplies the flow rate to a cooling/lubrication circuit to reduce a load of the entirety of a low-pressure portion, improving fuel efficiency.

Various aspects of the present invention provide an oil supply system of an automatic transmission for a vehicle, which may include: a low-pressure oil pump suctioning oil stored in an oil pan through a suction passage and discharging the oil to a low-pressure passage; a torque converter control valve controlling a flow supplied through the low-pressure passage while recirculating some of a surplus flow rate at a predetermined low-pressure point and supplying the controlled flow rate to an operating-side chamber of a torque converter and a downstream valve; a torque converter lock-up clutch switch valve supplying the flow rate supplied from the torque converter control valve and a circulation flow rate of the operating-side chamber of the torque converter to a lubrication passage including a cooler, which is connected to a cooling and lubrication portion; a torque converter pressure control valve supplying the flow rate to a non-operating side chamber of the torque converter by variably controlling D-range pressure; a high-pressure oil pump boosting some of the flow rate supplied through the low-pressure passage and discharging the boosted flow rate to a high-pressure passage; and a line regulator valve supplying the surplus flow rate during a control process to the low-pressure passage while controlling the flow rate supplied through the high-pressure passage as a stable high-pressure flow rate and supplying the controlled flow rate to a high-pressure portion, in which the flow rate circulated in the torque converter control valve is connected to be supplied to the lubrication passage through a recirculation passage.

Furthermore, the torque converter control valve may be a spool valve and while the torque converter control valve is controlled by feedback oil pressure applied to one end and some oil pressure circulated in the torque converter, the torque converter control valve may be configured to control the flow rate by recirculating some of the surplus flow rate at the predetermined low-pressure point.

Furthermore, the line regulator valve may be the spool valve and may be configured to be controlled by the oil pressure of the high-pressure passage, which is applied to one end and control pressure of a solenoid valve against the oil pressure of the high-pressure passage.

Moreover, the torque converter control valve may be the spool valve and may be configured to be controlled by the feedback oil pressure applied to one end and some oil pressure circulated in the torque converter and the control pressure of the solenoid valve against the feedback oil pressure and the circulation pressure of the torque converter at an opposite side thereof.

Furthermore, a first bypass passage connecting an upstream and a downstream based on the cooler and a second bypass passage connecting the downstream of the cooler and the recirculation passage may be formed in the lubrication passage including the cooler.

Furthermore, check valves may be configured on the upstream lubrication path of the cooler and the recirculation passage, respectively in the lubrication passage including the cooler.

According to various aspect of the present invention, in an oil pressure supply system, when a flow rate supplied to a torque converter is unnecessarily large, a surplus flow rate is bypassed and supplied to cooling and lubrication passages to reduce a load of the entirety of a low-pressure portion, improving fuel efficiency.

Furthermore, the oil pressure supply system according to the exemplary embodiment of the present invention allows a torque converter control valve to be controlled by control pressure of a solenoid valve according to oil pressure and flow rate required by the torque converter, additionally securing a remaining flow rate as a lubrication flow rate.

Furthermore, the oil pressure supply system according to the exemplary embodiment of the present invention forms a second bypass passage connecting a downstream of a cooler and a recirculation passage so that when the flow rate is large in the recirculation passage, the flow rate may be directly supplied to a lubrication portion without passing through the cooler, additionally securing the lubrication flow rate.

Furthermore, in the oil pressure supply system according to the exemplary embodiment of the present invention, first and second check valves are disposed on an upstream lubrication passage of the cooler and the recirculation passage, respectively, preventing reverse flow from the lubrication passage to an upstream side thereof.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
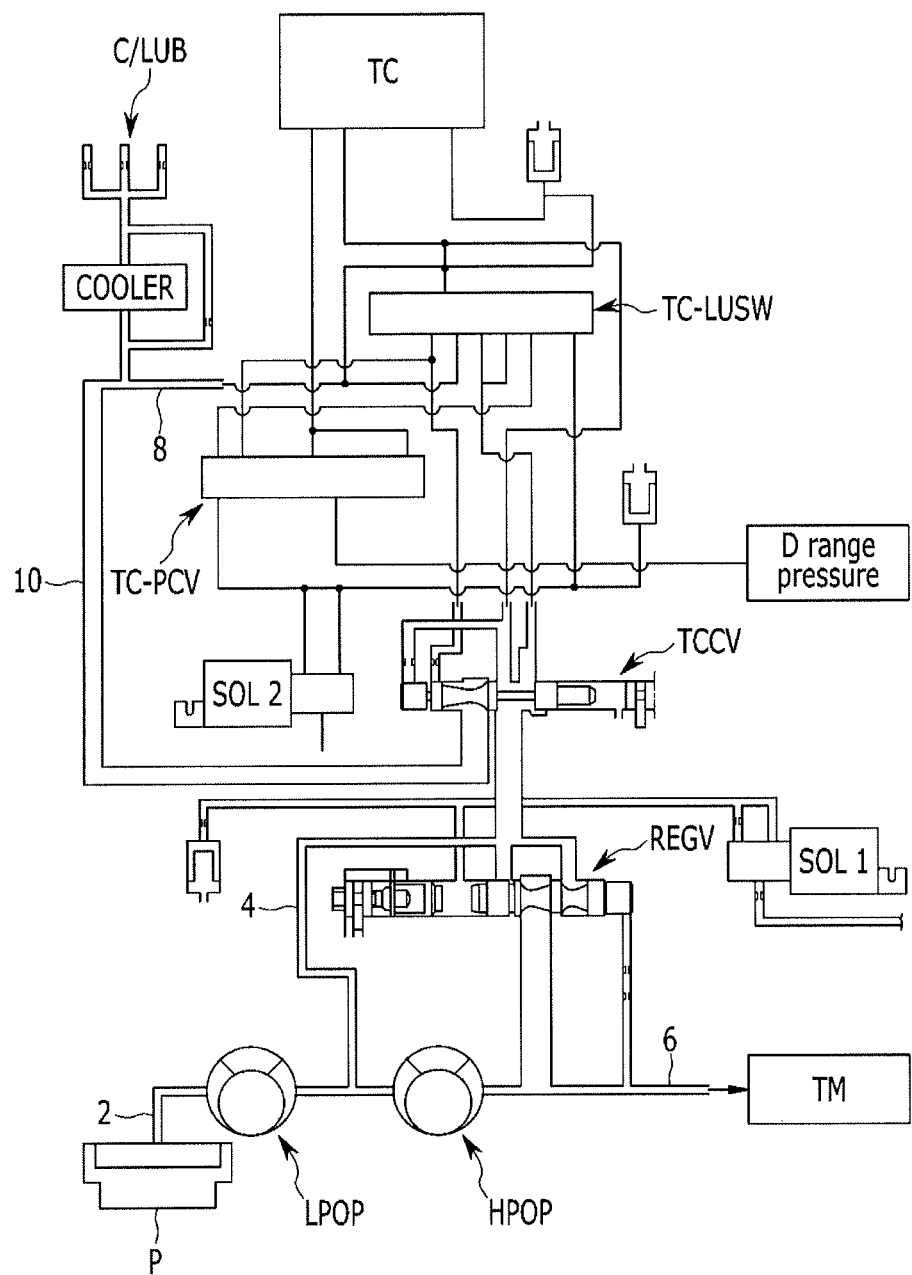
FIG. 1 is a schematic diagram of an oil pressure supply system according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments, it will be understood that the present description is not intended to limit the present invention(s) to those exemplary embodiments. On the contrary, the present invention(s) is/are intended to cover not only the exemplary embodiments, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

Parts not associated with description are omitted for clearly describing the present invention and like reference numerals designate like elements throughout the specification.

In the following description, dividing names of components into first, second and the like is to divide the names because the names of the components are the same as each other and an order thereof is not particularly limited.

FIG. 1 is a schematic diagram of an oil pressure supply system according to various exemplary embodiments of the present invention.

Referring to FIG. 1, the oil pressure supply system according to the exemplary embodiment of the present invention may include a low-pressure oil pump LPOP, a high-pressure oil pump HPOP, a line regulator valve REGV, a torque converter control valve TCCV, a torque converter lock-up clutch switch valve TC-LUSW, a torque converter pressure control valve TC-PVC, and first and second solenoid valves SOL1 and SOL2. Oil pressure pumped from the low-pressure oil pump LPOP and the high-pressure oil pump HPOP may be supplied to a transmission portion TM, a torque converter TC, and a cooling and lubrication portion C/LUB.

A low-pressure flow rate generated by the low-pressure oil pump LPOP may be supplied to a low-pressure portion including the torque converter T/C and the cooling and lubrication portion C/LUB. A high-pressure flow rate generated by the high-pressure oil pump HPOP may be supplied to a high-pressure portion which is the transmission portion TM for operating a friction member related to shifting.

The low-pressure flow rate refers to a flow rate controlled and supplied at low pressure to such an extent to operate the torque converter T/C and smoothly perform cooling and lubrication in the cooling and lubrication portion C/LUB.

Furthermore, the high-pressure flow rate refers to a flow rate which is controlled at relatively high pressure to such an extent to smoothly operate multiple friction members which selectively operate at the time of shifting.

The low-pressure flow rate generated by the low-pressure oil pump LPOP) may be controlled by the torque converter control valve TCCV and supplied to the cooling and lubrication portion C/LUB.

Furthermore, the high-pressure flow rate acquired by boosting and discharging some of the flow rate generated by the low-pressure oil pump LPOP is controlled through the line regulator valve REGV and supplied to the transmission portion TM which is the high-pressure portion.

In such an oil pressure supply system, in the various exemplary embodiments of the present invention, when the high-pressure flow rate generated by the high-pressure oil pump HPOP is controlled by the line regulator valve REGV, a surplus flow rate may be supplied to the torque converter control valve TCCV together with the low-pressure flow rate.

The low-pressure oil pump LPOP may be a mechanical pump driven by rotational power of an engine or an electric pump driven by an electric motor as is well-known in the art and the high-pressure oil pump HPOP may be the electric pump driven by the electric motor.

The low-pressure oil pump LPOP is connected to an oil pan P through a suction passage 2. The low-pressure flow rate generated by the low-pressure oil pump LPOP is supplied to the low pressure passage 4 and supplied to the torque converter control valve TCCV.

The high-pressure oil pump HPOP boosts the flow rate of the low pressure passage 4 to the high-pressure flow rate and controls the boosted flow rate at stable line pressure of the line regulator valve REGV to supply the flow rate at the stable line pressure to the transmission portion TM which is the high-pressure portion through the high-pressure passage 6. The surplus flow rate during a control process is supplied to the low-pressure passage 4 to be supplied to the torque converter control valve TCCV.

The line regulator valve REGV may be a spool valve. The line regulator valve REGV is controlled by the oil pressure of the high pressure passage 6, which is applied to one end and control pressure of the first solenoid valve SOL1 against the oil pressure of the high pressure passage 6 at an opposite side to stably control the high-pressure flow rate.

The torque converter control valve TCCV may be the spool valve CF. Such a torque converter control valve TCCV may be controlled by feedback oil pressure applied to one end of torque converter control valve TCCV and some oil pressure circulated in the torque converter TC.

Herein, the torque converter control valve TCCV may control the oil pressure while recirculating some of the surplus flow rate at a predetermined low-pressure point.

The flow rate controlled by the torque converter control valve TCCV is supplied directly to an operating-side chamber of the torque converter TC or supplied to a lubrication passage 8 through the torque converter lock-up clutch switch valve TC-LUSW.

Furthermore, the flow rate recirculated in the torque converter control valve TCCV is supplied to the lubrication passage 8 through a recirculation passage 10.

The torque converter lock-up clutch switch valve TC-LUSW is controlled by the control pressure of the second solenoid valve SOL2, which is applied to one end to supply the flow rate supplied from the torque converter control valve TCCV or supply the flow rate at the control pressure of the torque converter pressure control valve TC-PCV.

The torque converter pressure control valve TC-PCV may be the spool valve. Such a torque converter pressure control valve TC-PCV is a valve which is controlled by the feedback oil pressure applied to one end, the control pressure of the second solenoid valve SOL supplied at the opposite side against the feedback oil pressure, and the control pressure supplied from the torque converter lock-up clutch switch valve TC-LUSW through two paths to selectively supply D-range pressure supplied from the transmission portion TM to a non-operating side chamber of the torque converter TC.

In the oil pressure supply system according to the various exemplary embodiments of the present invention, when the flow rate supplied from the low-pressure oil pump LPOP and the flow rate supplied from the line regulator valve REGV are joined and the flow rate supplied through the low-pressure passage 4 is controlled by the torque converter control valve TCCV, the generated surplus flow rate is supplied to the lubrication passage 8 through the recirculation passage 10.

As a result, when the flow rate supplied to the torque converter TC is unnecessarily large, the surplus flow rate is bypassed and supplied to the cooling and lubrication passage to reduce the load of the entirety of the low-pressure portion, improving fuel efficiency.

Figure 2:
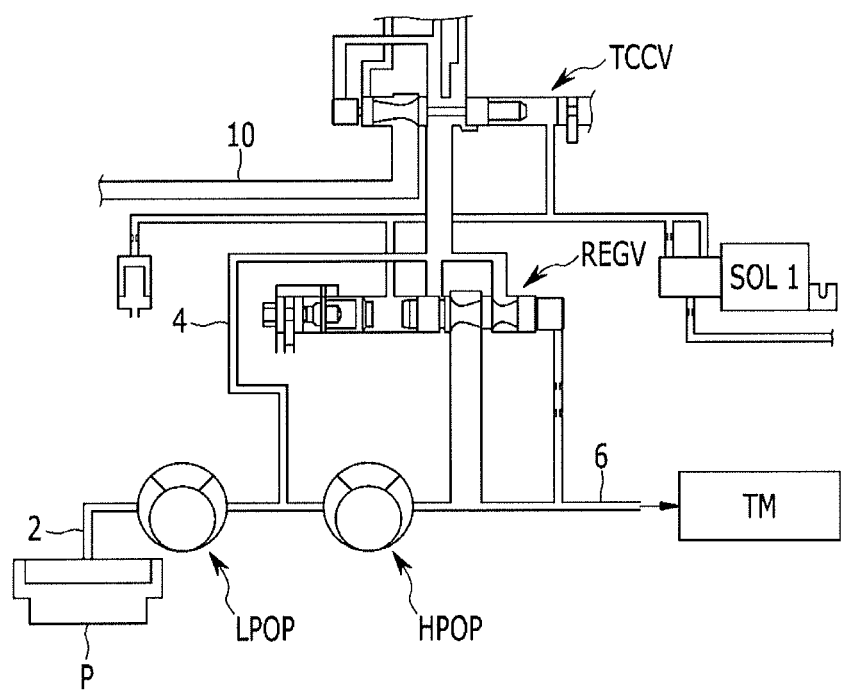
FIG. 2 is a partial view of an oil pressure supply system according to various exemplary embodiments of the present invention.

FIG. 2 is a partial view of an oil pressure supply system according to various exemplary embodiments of the present invention.

Referring to FIG. 2, in the various exemplary embodiments of the present invention, when the torque converter control valve TCCV is controlled, the torque converter control valve TCCV is controlled by the feedback oil pressure applied to one end and some oil pressure circulated in the torque converter TC, but in the various exemplary embodiments of the present invention, the torque converter control valve TCCV may be controlled while the control pressure of the first solenoid valve SOL1 is supplied to the opposite side against the feedback oil pressure and the circulation oil pressure of the torque converter TC.

As a result, unlike the various exemplary embodiments that controls the flow rate at the predetermined low-pressure point, the torque converter control valve TCCV is controlled by the control pressure of the first solenoid valve SOL1 according to the oil pressure and the flow rate required by the torque converter TC to additionally secure the remaining flow rate as a lubrication flow rate.

Figure 3:
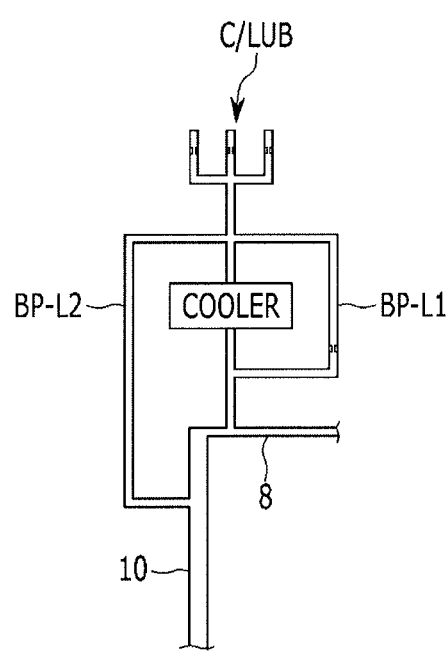
FIG. 3 is a partial view of an oil pressure supply system according to various exemplary embodiments of the present invention.

FIG. 3 is a partial view of an oil pressure supply system according to various exemplary embodiments of the present invention.

Referring to FIG. 3, in the various exemplary embodiments of the present invention, the oil pressure supply system is configured in a structure that simply connects the lubrication passage 8 and the recirculation passage 10, but in the various exemplary embodiments of the present invention, a second bypass passage BP-L2 connecting a downstream of the cooler and the recirculation passage 10 is configured in addition to a first bypass passage BP-L1 connecting the downstream and an upstream.

Accordingly, when the flow rate in the recirculation passage 10 is large, the flow rate may be directly supplied to the lubrication portion, additionally securing the lubrication flow rate.

Figure 4:
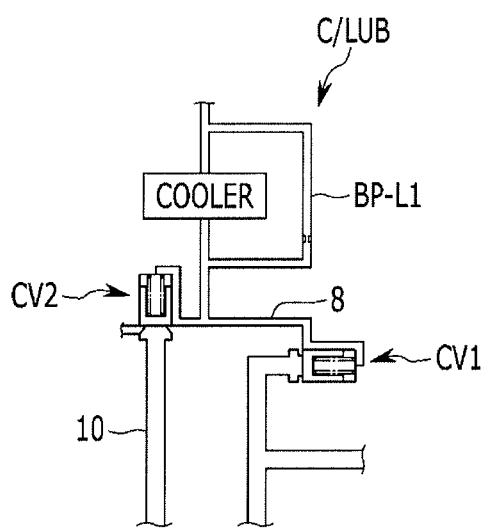
FIG. 4 is a partial view of an oil pressure supply system according to various exemplary embodiments of the present invention.

FIG. 4 is a partial view of an oil pressure supply system according to various exemplary embodiments of the present invention.

Referring to FIG. 4, in the various exemplary embodiments of the present invention, the oil pressure supply system is configured in a structure in which the lubrication passage 8 and the recirculation passage 10 are simply connected to each other, but in the various exemplary embodiments of the present invention, but in the various exemplary embodiments of the present invention, first and second check valves CV1 and CV2 are disposed on the upstream lubrication passage 8 of the cooler and the recirculation passage 10, respectively to prevent reverse flow from the lubrication passage 8 to the upstream side thereof.

In the oil pressure supply system according to the various exemplary embodiments of the present invention, when the flow rate supplied to the torque converter TC is unnecessarily large, the surplus flow rate is bypassed and supplied to the cooling and lubrication passages to reduce the load of the entirety of the low-pressure portion, improving the fuel efficiency.

Furthermore, the oil pressure supply system according to the various exemplary embodiments of the present invention allows the torque converter control valve TCCV to be controlled by the control pressure of the solenoid valve SOL1 according to the oil pressure and flow rate required by the torque converter TC, additionally securing the remaining flow rate as the lubrication flow rate.

Furthermore, the oil pressure supply system according to the various exemplary embodiments of the present invention forms the second bypass passage BP-LW connecting the downstream of the cooler and the recirculation passage so that when the flow rate is large in the recirculation passage 10, the flow rate may be directly supplied to the lubrication portion without passing through the cooler, additionally securing the lubrication flow rate.

Furthermore, in the oil pressure supply system according to the exemplary embodiment of the present invention, the first and second check valves CV1 and CV2 are disposed on an upstream lubrication passage 8 of the cooler and the recirculation passage 10, respectively, preventing reverse flow from the lubrication passage 8 to an upstream side thereof.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An oil supply system of an automatic transmission for a vehicle, comprising:
    a low-pressure oil pump mounted between a suction passage and a low-pressure passage and suctioning oil stored in an oil pan through the suction passage connected to the oil pan and discharging the oil to the low-pressure passage;
    a torque converter control valve connected to the low-pressure passage and controlling a flow supplied through the low-pressure passage while recirculating a predetermined amount of a surplus flow rate at a predetermined low-pressure point and supplying the controlled flow rate to an operating-side chamber of a torque converter;
    a torque converter lock-up clutch switch valve connected to the torque converter control valve and supplying the flow rate supplied from the torque converter control valve and a circulation flow rate of the operating-side chamber of the torque converter to a lubrication passage connected to the torque converter control valve and including a cooler, wherein the cooler is connected to a cooling and lubrication portion;
    a torque converter pressure control valve supplying the flow rate to a non-operating side chamber of the torque converter by variably controlling D-range pressure;
    a high-pressure oil pump connected to the low-pressure passage and boosting a predetermined amount of the flow rate supplied through the low-pressure passage and discharging the boosted flow rate to a high-pressure passage connected to the high-pressure oil pump; and
    a line regulator valve connected to the low-pressure passage and the high-pressure passage and supplying the surplus flow rate during a control process to the low-pressure passage while controlling the flow rate supplied through the high-pressure passage as a stable high-pressure flow rate and supplying the controlled flow rate to a high-pressure portion,
    wherein the flow rate circulated in the torque converter control valve is supplied to the lubrication passage through a recirculation passage connecting the torque converter control valve and the lubrication passage, and
    wherein in the lubrication passage including the cooler, a first bypass passage is connected between an upstream and a downstream of the cooler.

2. The oil pressure supply system of claim 1, wherein the torque converter control valve is a spool valve and while the torque converter control valve is configured to be controlled by a feedback oil pressure applied to one end portion of the torque converter control valve and a predetermined oil pressure circulated in the torque converter, the torque converter control valve is configured to control the flow rate by recirculating a predetermined amount of the surplus flow rate at the predetermined low-pressure point.

3. The oil pressure supply system of claim 1, wherein the line regulator valve is a spool valve, and is configured to be controlled by an oil pressure of the high-pressure passage, which is applied to one end portion of the line regulator and control pressure of a first solenoid valve fiducially connected to the line regulator valve, against the oil pressure of the high-pressure passage connected to the line regulator valve.

4. The oil pressure supply system of claim 1, wherein the torque converter control valve is a spool valve and is configured to be controlled by a feedback oil pressure applied to one end portion of the torque converter control valve and a predetermined oil pressure circulated in the torque converter and control pressure of a second solenoid valve against the feedback oil pressure and the circulation pressure of the torque converter at an opposite side thereof.

5. The oil pressure supply system of claim 1, wherein in the lubrication passage including the cooler, a second bypass passage is connected between the downstream of the cooler and the recirculation passage.

6. The oil pressure supply system of claim 1, wherein in the lubrication passage, cooler check valves are mounted on an upstream lubrication path of the cooler and the recirculation passage, respectively.

* * * * *